United States Patent
Kinthada Venkata et al.

(10) Patent No.: US 10,575,233 B2
(45) Date of Patent: Feb. 25, 2020

(54) METHODS AND APPARATUSES FOR DETERMINING THE GAIN OF VEHICLE ANTENNAS

(71) Applicant: QUALCOMM Incorporated, San Diego, CA (US)

(72) Inventors: Madhusudan Kinthada Venkata, San Diego, CA (US); Srinivasan Balasubramanian, San Diego, CA (US); Raj Surya Pratha, San Diego, CA (US); Manjinder Singh Sandhu, Poway, CA (US); Siva Kumar Jujaray, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 15/809,468

(22) Filed: Nov. 10, 2017

(65) Prior Publication Data

US 2019/0150050 A1 May 16, 2019

(51) Int. Cl.
| | |
|---|---|
| *H04W 36/30* | (2009.01) |
| *H04W 36/00* | (2009.01) |
| *H04W 52/50* | (2009.01) |
| *H04B 17/13* | (2015.01) |
| *H04W 52/02* | (2009.01) |
| *H04W 52/52* | (2009.01) |
| *H04W 52/24* | (2009.01) |
| *H04W 74/08* | (2009.01) |
| *H04W 52/36* | (2009.01) |

(52) U.S. Cl.
CPC ............ *H04W 36/30* (2013.01); *H04B 17/13* (2015.01); *H04W 36/0016* (2013.01); *H04W 52/50* (2013.01); *H04W 36/0094* (2013.01); *H04W 52/0216* (2013.01); *H04W 52/241* (2013.01); *H04W 52/365* (2013.01); *H04W 52/52* (2013.01); *H04W 74/0833* (2013.01)

(58) Field of Classification Search
CPC ...... H04W 36/30; H04W 52/00; H04W 52/50
See application file for complete search history.

(56) References Cited

U.S. PATENT DOCUMENTS

| | | |
|---|---|---|
| 2016/0150445 A1 | 5/2016 | Sandhu et al. |
| 2016/0337957 A1 | 11/2016 | Gonsalves et al. |
| 2016/0373995 A1 | 12/2016 | Kinthada Venkata et al. |
| 2017/0064656 A1 | 3/2017 | Kim et al. |
| 2017/0251391 A1 | 8/2017 | Kinthada Venkata et al. |
| 2018/0192380 A1* | 7/2018 | Peitzer .................. H04W 52/52 |

* cited by examiner

*Primary Examiner* — Rhonda L Murphy
(74) *Attorney, Agent, or Firm* — Arent Fox, LLP

(57) ABSTRACT

Methods and apparatuses for wireless communication are provided. In some aspects, a user equipment (UE) may obtain a gain value based on a difference between an reference signal receive power (RSRP) value of a first antenna and an RSRP value of a second antenna, where the first antenna may be located on an exterior of the UE and the second antenna may be located within an interior of the UE. Further, in some aspects, the UE may obtain an antenna gain value based at least on a random access channel (RACH) power value and a reference signal receive quality (RSRQ) offset value. Additionally, in some aspects, the UE may obtain the antenna gain value based on one of a matching entry in a memory log or a minimum of a maximum antenna gain value or an aggregation of a RACH gain value and an RSRQ offset value.

28 Claims, 12 Drawing Sheets

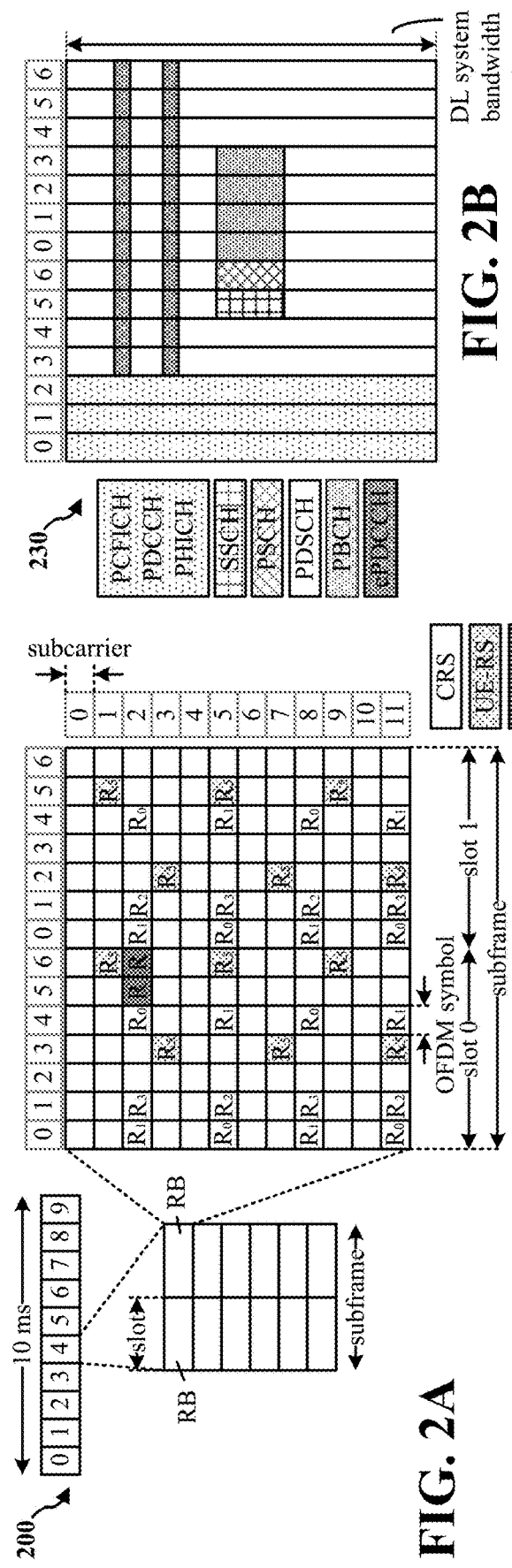
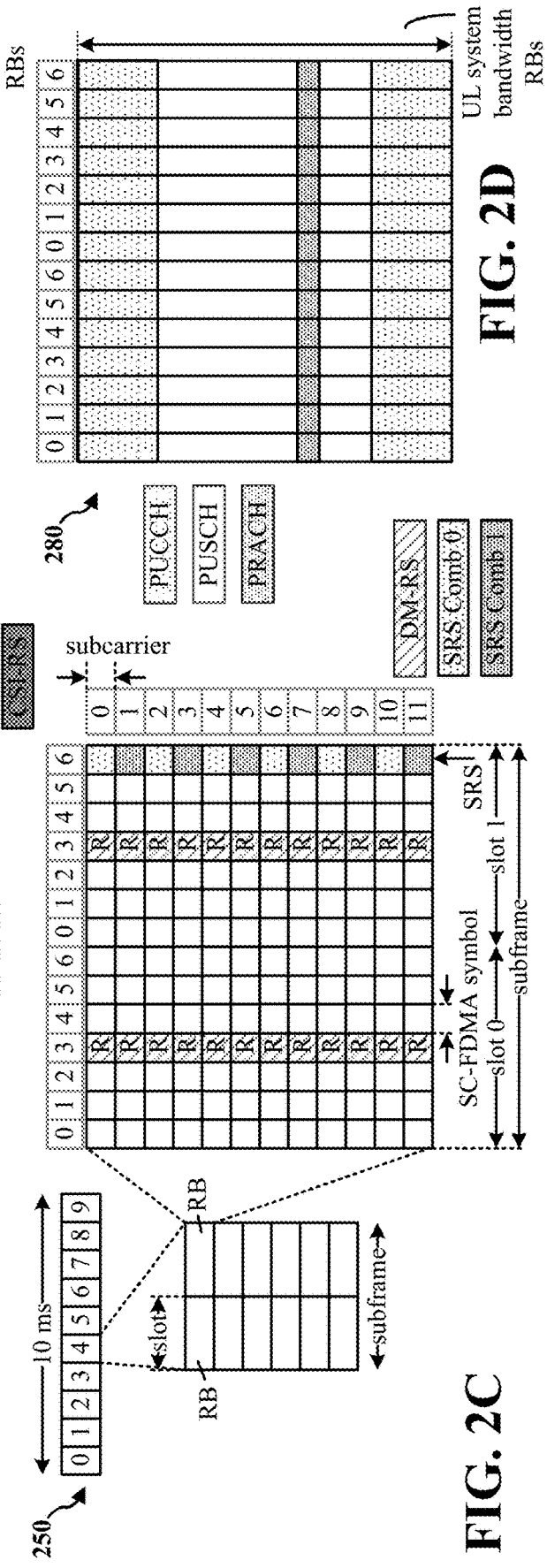
FIG. 2A
FIG. 2B
FIG. 2C
FIG. 2D

METHODS AND APPARATUSES FOR DETERMINING THE GAIN OF VEHICLE ANTENNAS

BACKGROUND

The present disclosure relates generally to communication systems, and more particularly, to methods for determining the gain of rooftop vehicle antennas.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Additionally, LTE-based communication systems that reduce network deployment and operational costs may employ vehicle communication. Specifically, vehicle communication may be used to further boost network capacity. However, there currently exists limitations in vehicle communication with respect to transmissions on or using one or more resources. As such, systems and methods that effectively communicate using such resources may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a user equipment (UE). The method includes determining a reference signal receive power (RSRP) value associated with a serving cell using a first antenna. The method further includes tuning to a second antenna different from the first antenna. Moreover, the method includes determining an RSRP value associated with the serving cell using the second antenna. The method includes obtaining a gain value based on a difference between the RSRP value of the first antenna and the RSRP value of the second antenna, wherein the first antenna is located on an exterior of the UE and the second antenna is located within an interior of the UE. The method further includes maintaining a connection with the serving cell or reselecting to another cell based on the gain value.

In an aspect of the disclosure, an apparatus for wireless communication includes means for determining a RSRP value associated with a serving cell using a first antenna. The apparatus further includes means for tuning to a second antenna different from the first antenna. Additionally, the apparatus includes means for determining an RSRP value associated with the serving cell using the second antenna. The apparatus include means for obtaining a gain value based on a difference between the RSRP value of the first antenna and the RSRP value of the second antenna, wherein the first antenna is located on an exterior of the UE and the second antenna is located within an interior of the UE. The apparatus further includes means for maintaining a connection with the serving cell or reselecting to another cell based on the gain value.

In an aspect of the disclosure, a computer-readable medium storing computer executable code for wireless communication includes code for determining a RSRP value associated with a serving cell using a first antenna. The computer-readable medium further includes code for tuning to a second antenna different from the first antenna. Additionally, the computer-readable medium includes code for determining an RSRP value associated with the serving cell using the second antenna. The computer-readable medium further includes code for obtaining a gain value based on a difference between the RSRP value of the first antenna and the RSRP value of the second antenna, wherein the first antenna is located on an exterior of the UE and the second antenna is located within an interior of the UE. The computer-readable medium further includes code for maintaining a connection with the serving cell or reselecting to another cell based on the gain value.

In an aspect of the disclosure, an apparatus for wireless communication includes a memory and at least one processor communicatively coupled to the memory. The at least one processor configured to determine a RSRP value associated with a serving cell using a first antenna. The at least one processor is further configured to tune to a second antenna different from the first antenna. Additionally, the at least one processor is configured to determine an RSRP value associated with the serving cell using the second antenna. The at least one processor is further configured to obtain a gain value based on a difference between the RSRP value of the first antenna and the RSRP value of the second antenna, wherein the first antenna is located on an exterior of the UE and the second antenna is located within an interior of the UE. The at least one processor is further configured to maintain a connection with the serving cell or reselecting to another cell based on the gain value.

In an aspect of the disclosure, a method is provided for wireless communication at a UE. The method includes determining a current reference signal receive quality (RSRQ) value associated with a serving cell. The method further includes determining whether a random access channel (RACH) failure has occurred. Additionally, the method includes, in accordance with a determination that the RACH failure has occurred, obtaining an antenna gain based at least on a RACH power value and an RSRQ offset value. Moreover, the method includes, in accordance with a determination that the RACH failure has not occurred, obtaining the antenna gain based on one of a matching entry in a memory log or a minimum of a maximum antenna gain value or an aggregation of a RACH gain value and an RSRQ offset value. The method further includes maintaining a connection with the serving cell or reselecting to another cell based on the gain value.

In an aspect of the disclosure, an apparatus for wireless communication includes means for determining a current RSRQ value associated with a serving cell. The apparatus further includes means for determining whether a RACH failure has occurred. Additionally, the apparatus includes, in accordance with a determination that the RACH failure has occurred, means for obtaining an antenna gain based at least on a RACH power value and an RSRQ offset value. Moreover, the apparatus includes, in accordance with a determination that the RACH failure has not occurred, means for obtaining the antenna gain based on one of a matching entry in a memory log or a minimum of a maximum antenna gain value or an aggregation of a RACH gain value and an RSRQ offset value. The apparatus further includes means for maintaining a connection with the serving cell or reselecting to another cell based on the gain value.

In an aspect of the disclosure, a computer-readable medium storing computer executable code for determining a current RSRQ value associated with a serving cell. The computer-readable medium further includes code for determining whether a RACH failure has occurred. Additionally, the computer-readable medium includes, in accordance with a determination that the RACH failure has occurred, obtaining an antenna gain based at least on a RACH power value and an RSRQ offset value. Moreover, the computer-readable medium includes, in accordance with a determination that the RACH failure has not occurred, obtaining the antenna gain based on one of a matching entry in a memory log or a minimum of a maximum antenna gain value or an aggregation of a RACH gain value and an RSRQ offset value. The computer-readable medium further includes code for maintaining a connection with the serving cell or reselecting to another cell based on the gain value.

In an aspect of the disclosure, an apparatus for wireless communication includes a memory and at least one processor communicatively coupled to the memory. The at least one processor is configured to determine a current RSRQ value associated with a serving cell. The at least one processor is further configured to determine whether a RACH failure has occurred. Additionally, the at least one processor is configured to, in accordance with a determination that the RACH failure has occurred, obtain an antenna gain based at least on a RACH power value and an RSRQ offset value. Moreover, the at least one processor is configured to, in accordance with a determination that the RACH failure has not occurred, obtain the antenna gain based on one of a matching entry in a memory log or a minimum of a maximum antenna gain value or an aggregation of a RACH gain value and an RSRQ offset value. The at least one processor is further configured to maintain a connection with the serving cell or reselecting to another cell based on the gain value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
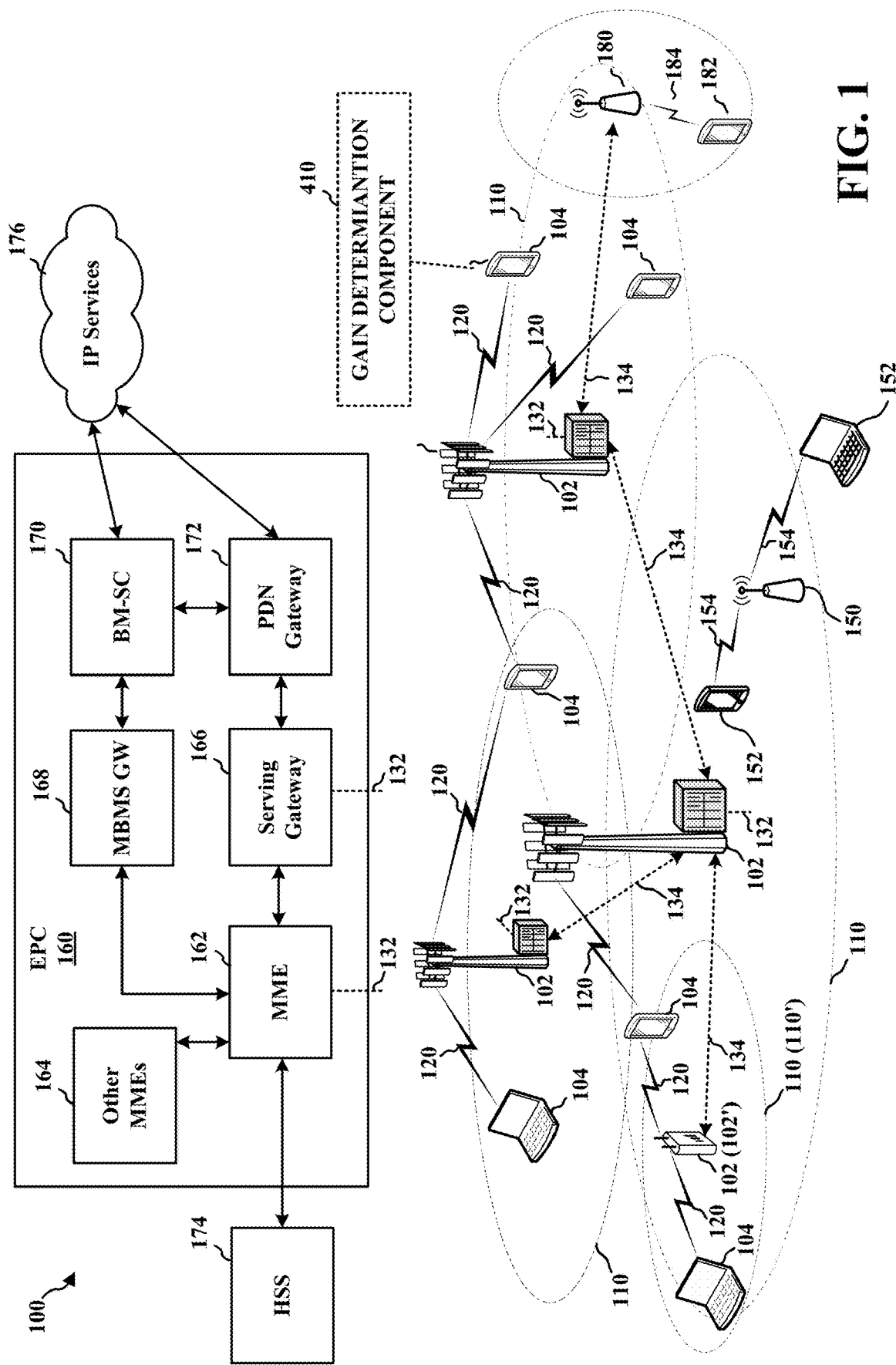
FIG. 1 is a diagram illustrating an example of a wireless communications system and an access network in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present aspects generally relate to determining a gain of at least one antenna of a user equipment (UE) such as a rooftop automotive antenna. Specifically, for such UEs, determining the gain may prove challenging for a number of reasons. For example, the gain of the antenna or antennas may be band specific, in that the antenna is operating at or according to a certain frequency band. Further, the gain may depend on the a size of the antenna, size of the UE (e.g., car), and/or a length of a cable connecting the antenna (e.g., rooftop antenna) to a modem. Hence, accurate determination of a gain for one or more antennas of a UE operating at a certain band (e.g., Long Term Evolution (LTE) band) may not be possible unless the modem directly estimates a gain of the one or more antennas. In some aspects, the antenna gain parameter may be used to perform adjustments to mobility procedures/algorithms.

Moreover, some UE modems such as modems located within automobiles may experience uplink and downlink imbalance. Due to the high gain of an external antenna of such UEs, and in some cases the UE having or being located near a reflective surface (e.g., the roof of a vehicle), the net downlink antenna may be higher as compared to the uplink. As a result of such imbalance, the modem may determine or otherwise have different uplink and downlink coverage areas. For instance, in some aspects the modem may have downlink coverage but a random access channel (RACH) procedure may nonetheless fail due to uplink power limitations. Also, in some aspects, if the modem is outside an uplink coverage area but within a downlink coverage area, the UE modem may select or camp on a cell only to experience a RACH failure. The forgoing scenario may be particularly evident in border crossing scenarios where a UE may latch or camp on an operator's band (e.g., of the exiting country) for too long due to high downlink gain when inside another country, resulting in RACH failure. As such, it may be desirable to determine the gain of UE antennas such as automobile rooftop antennas.

Accordingly, the present aspects provide techniques for determining a gain of one or more UE antennas. In an aspect, a UE may periodically measure a downlink of a serving cell using one or more external and internal antennas. The UE may then determine the gain of the antenna based on a difference between the reference signal receive power (RSRP) of or using the external antenna and the RSRP of or using the internal antenna. In another aspect, a UE may determine an antenna gain based on whether a RACH procedure is successful. For example, when the RACH procedure is unsuccessful, a link complete scenario may determine a reference signal received quality (RSRQ) offset value based on a different between a current RSRQ value and a previous RSRQ value. The UE may also determine an RACH gain based on a difference between an initial RACH gain value corresponding to a first transmit power and a final RACH gain value corresponding to a successful transmit power. The antenna gain may then be an aggregate of the RACH gain value and the RSRQ offset value. In a link failure scenario, the UE may initially determine whether a learning log in a memory includes a matching antenna gain value. If not, the antenna gain may be determined based on a minimum of a maximum antenna gain or an aggregate of a RACH gain value and a RSRQ offset value. In some aspects, the antenna gain may be used to determine whether to maintain a connection with the serving cell or reselect to another cell.

FIG. 1 is a diagram illustrating an example of a wireless communications system and an access network 100, including one or more UEs 104 that may include a gain determination component 410 configured to determine a gain of one or more antennas, for example, located in a vehicle according to an RSRP scheme and/or an RSRQ and RACH open loop power scheme. The operation of UE 104 having gain determination component 410 is described in more detail below, in the discussion of FIGS. 4-8.

The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 180 may utilize beamforming 184 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. For example, a UE such as UE 110 (FIG. 1) including gain determination component 410 (FIGS. 1 and 4) may communicate with another device (e.g., another UE) and/or network entity (e.g., base station 120, FIG. 1) in accordance with the aspects of one or more of FIGS. 2A-2D. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
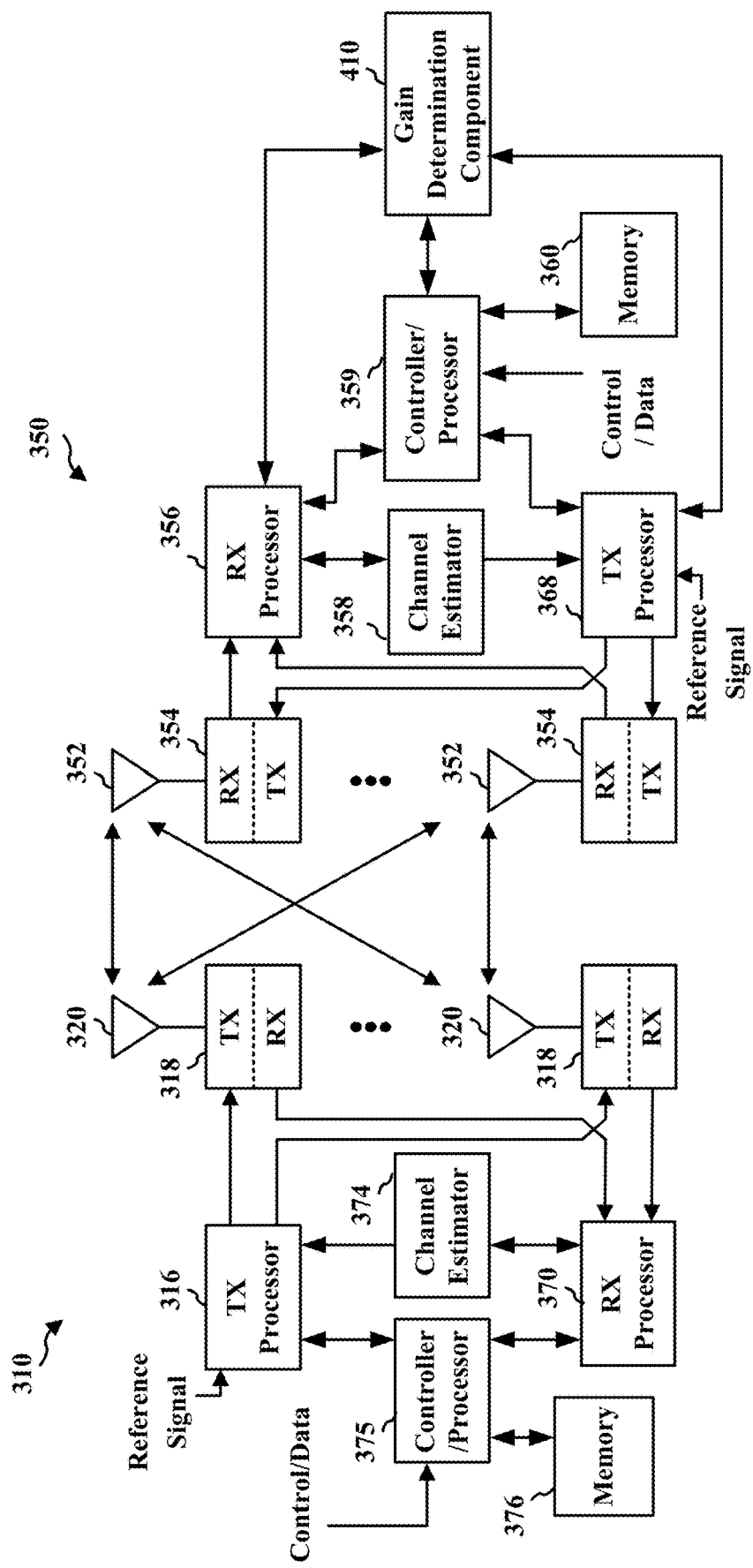
FIG. 3 is a diagram illustrating an example of an evolved Node B (eNB) and user equipment (UE) in an access network, and in accordance with some aspects of the present disclosure.

FIG. 3 is a block diagram of an eNB 310 in communication with a UE 350 including the gain determination component 410, which may be configured to determine a gain of one or more antennas, for example, located in a vehicle according to an RSRP scheme and/or an RSRQ and RACH open loop power scheme. UE 350 may be the same as or similar to UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
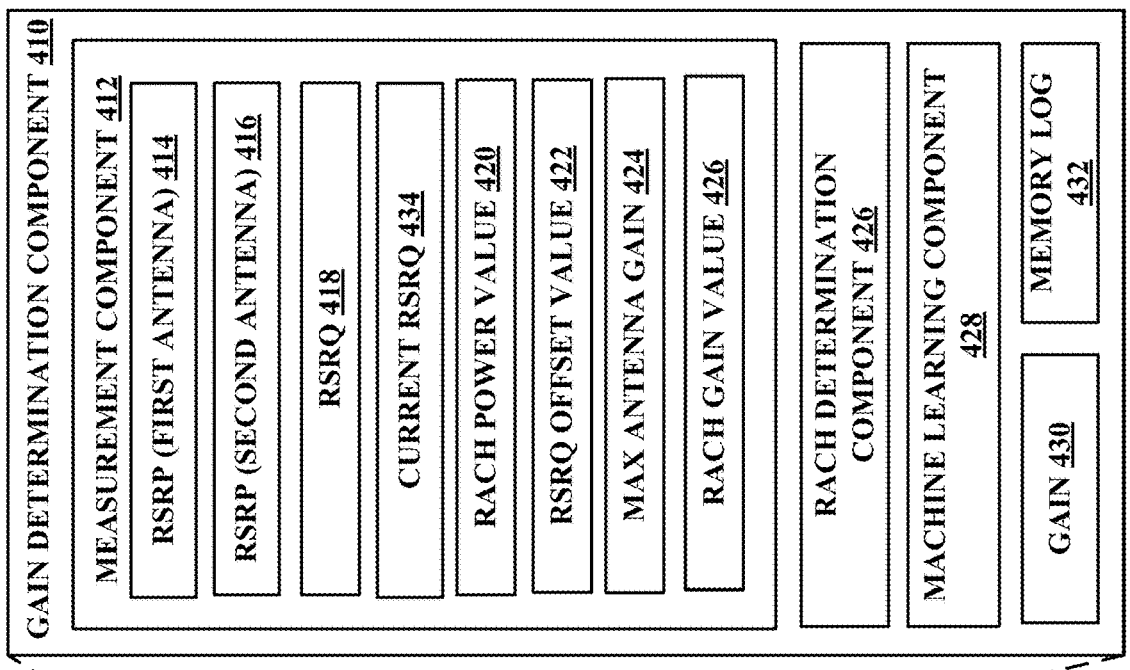
FIG. 4 is a diagram of determining a gain of a vehicular antenna within a device-to-device communications system in accordance with some aspects of the present disclosure.
Figure 4:
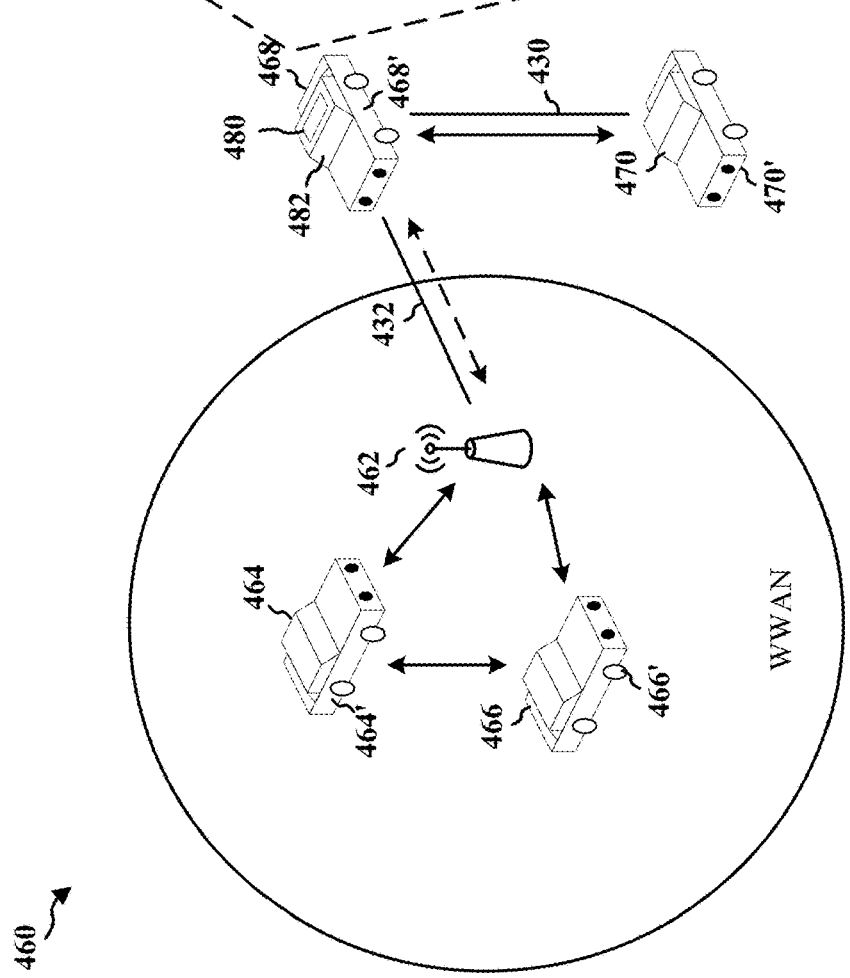

FIG. 4 is a diagram of a device-to-device (D2D) communications system 460. The D2D communications system 460 includes a plurality of vehicles 464, 466, 468, 470 each of which may include respective UEs 464', 466', 468', 470'. UEs 464', 466', 468', 470' may be the same as or similar to UEs 104, e.g., including gain determination component 410 and its associated components. The D2D (or vehicle-to-vehicle) communications system 460 may overlap with a cellular communications system, such as for example, a WWAN. Some of the UEs 464', 466', 468', 470' may communicate together in D2D communication using the DL/UL WWAN spectrum, some of the UEs may communicate with the base station 462 (e.g., via communication link 432), and some of the UEs may do both. For example, as shown in FIG. 4, the UEs 468', 470' are in D2D communication and the UEs 464', 466' are in D2D communication. The UEs 464', 466' are also communicating with a network entity, e.g., the base station 462. The D2D communication may be through one or more sidelink channels (e.g., sidelink channel 430), such as a physical sidelink broadcast channel (PSBCH), a physical sidelink discovery channel (PSDCH), a physical sidelink shared channel (PSSCH), and/or a physical sidelink control channel (PSCCH).

In an example, the vehicle 468 may include or otherwise have integrated therein, UE 468', which may include the gain determination component 410. The vehicle 468 and/or the UE 468' may also include a first antenna 480, which may, in some aspects, be an external antenna. The vehicle 468 and/or the UE 468' may also include a second antenna 482, which may, in some aspects, be an internal antenna. In some aspects, the gain determination component 410 may determine a gain 430 of one or more antennas, for example, located in a vehicle according to an RSRP scheme and/or an RSRQ and RACH open loop power scheme. The gain determination component 410 may include a measurement component 412 for maintaining one or more measurements related to determining the gain 430 of one or more antennas of vehicle 468.

According to the RSRP scheme, the gain determination component 410 may periodically measure the downlink of the serving cell of base station 462 using the first antenna 480 (e.g., external antenna) and the second antenna 482 (e.g., internal antenna). That is, once every discontinuous reception, the UE 468' may tune to the second antenna 482 (e.g., internal antenna) and measure the serving cell RSRP to acquire the RSRP 416. The gain determination component 410 may then determine the gain 430 based on a difference between an RSRP 414 of the first antenna 480 (e.g., external antenna) and an RSRP 416 of the second antenna 482 (e.g., internal antenna).

More specifically, the gain determination component 410 may be configured to initially measure the RSRP 414 associated with a serving cell using a first antenna 480. The UE 468' may then tune to the second antenna 482 and measure the RSRP 416 associated with the serving cell. The gain determination component 410 may be configured to determine the gain 430 based on a difference between the RSRP 414 of the first antenna 480 and the RSRP 416 of the second antenna 482. The UE 468' may use the gain 430 to determine whether to maintain a connection with the serving cell of base station 462 or reselect to another cell.

In some aspects, the gain determination component 410 may trigger RSRP scheme during low RSRQ scenarios. For example, the RSRP scheme may be triggered when a measured RSRQ 418 satisfies (e.g., less than or equal to) a threshold value. Further, in some aspects, the RSRP scheme may not include any losses in connected mode performance (e.g., throughput) as the tuneaway is performed during connected DRX off periods. Further, the RSRP scheme may result in minimal power penalty when switching to the second antenna 482 for measurements.

According to the RSRQ and RACH open loop power scheme, the gain 430 may be determined differently based on whether a success of a RACH procedure. Specifically, the gain determination component 410 may measure a current RSRQ 434. The gain determination component 410, via the RACH determination component 426, may be configured to determine whether a RACH failure has occurred. The gain determination component 410 may be configured to determine the gain 430 based at least on a RACH power value 420 and an RSRQ offset value 422 based on a determination that the RACH failure has occurred (e.g., also known as a link complete scenario). The gain determination component 410 may also be configured to determine the gain 430 based on one of a matching entry in a memory log 432 or a minimum of a maximum antenna gain 424 or an aggregation of a RACH gain 426 and an RSRQ offset value 428 based on a determination that the RACH failure has not occurred (e.g., also known as a link failure scenario). The UE 468' may use the gain 430 to determine whether to maintain a connection with the serving cell of base station 462 or reselect to another cell In some aspects, the RSRQ and RACH open loop power scheme may be particularly useful during abnormal conditions where there may be high gain resulting in a likelihood that an initial RACH may not succeed. That is, under normal conditions, such as where there is no high gain, the first RACH may typically succeed. Specifically, the RSRQ and RACH open loop power scheme may determine the gain 430 based on '(n−1)*Ωp', where 'Ωp' is the power ramp up and 'p' is the initial preamble power based on high gain signal RSRP. That is, the initial RACH transmit power 'p' may be calculated based on a downlink pathloss using an open loop power calculation. As such, a first retransmission may be represented as 'p+Ωp' and a second retransmission may be represented as 'p+2*Ωp'. Accordingly, when the UE 468' has succeeded after 'n' transmission attempts, the power at the $n^{th}$ RACH transmission may be represented as 'p+(n−1)*Ωp'. In some aspects, the determination of the gain 430 may also bounded by an interference and RACH success rate.

In the link complete scenario of the RSRQ and RACH open loop power scheme, the antenna gain 430 may be computed from the RACH power value 420 and the RSRQ offset value 422 (e.g., RACH delta). The determined antenna gain 430 may be stored in the memory log 432 along with other parameters outlined herein for use by, for example, the machine learning component 428. In the link incomplete or failure scenario of the RSRQ and RACH open loop power scheme, machine learning may be used to determine the antenna gain 430 at the a specified location. In the event there is no entry into the link failure scenario, the antenna gain 430 may be estimated from the RSRQ offset value 422 and the RACH power value 420 with a high ceiling on maximum gain (e.g., fixed). The RSRQ and RACH open loop power scheme may repeated for every RACH attempt. Further, for the RSRQ and RACH open loop power scheme, the second antenna 482 may not be used.

In some aspects, the gain determination component 410 may also determine the antenna gain 430 for or within other technologies such as, but not limited to UMTS (e.g., based on received signal code power (RSCP) and/or Ec/Io). The example methods and apparatuses discussed infra are applicable to any of a variety of wireless D2D communications systems, such as for example, a wireless device-to-device communication system based on LTE, V2X, VLinQ, Flash-LinQ, WiMedia, Bluetooth, ZigBee, or Wi-Fi based on the IEEE 802.11 standard. To simplify the discussion, the example methods and apparatus are discussed within the context of LTE. However, one of ordinary skill in the art would understand that the example methods and apparatuses are applicable more generally to a variety of other wireless device-to-device communication systems.

Figure 5A:
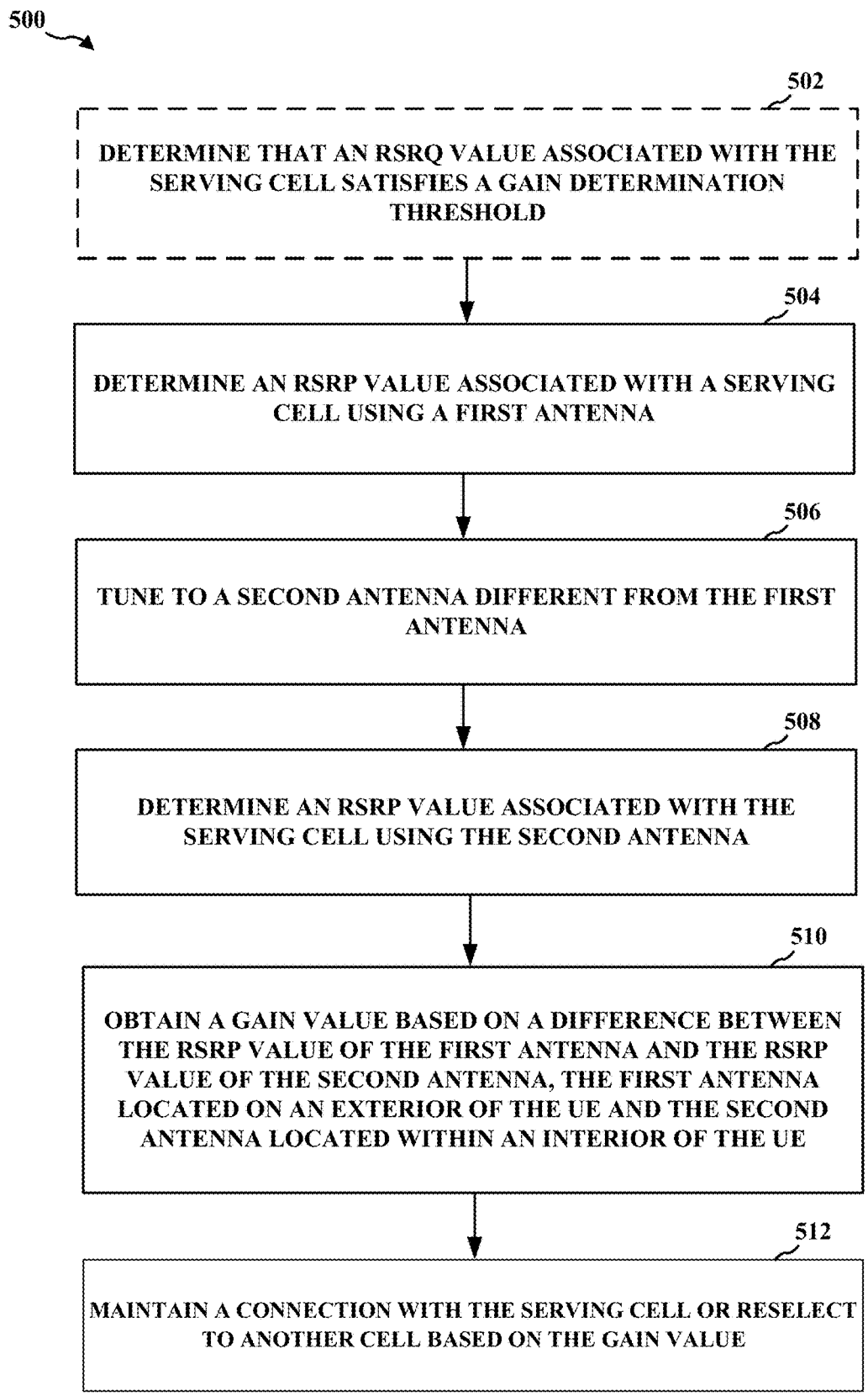
FIG. 5A is a flowchart of a method of using one or both of internal or external antennas to determines a gain at a UE in accordance with some aspects of the present disclosure.
Figure 5B:
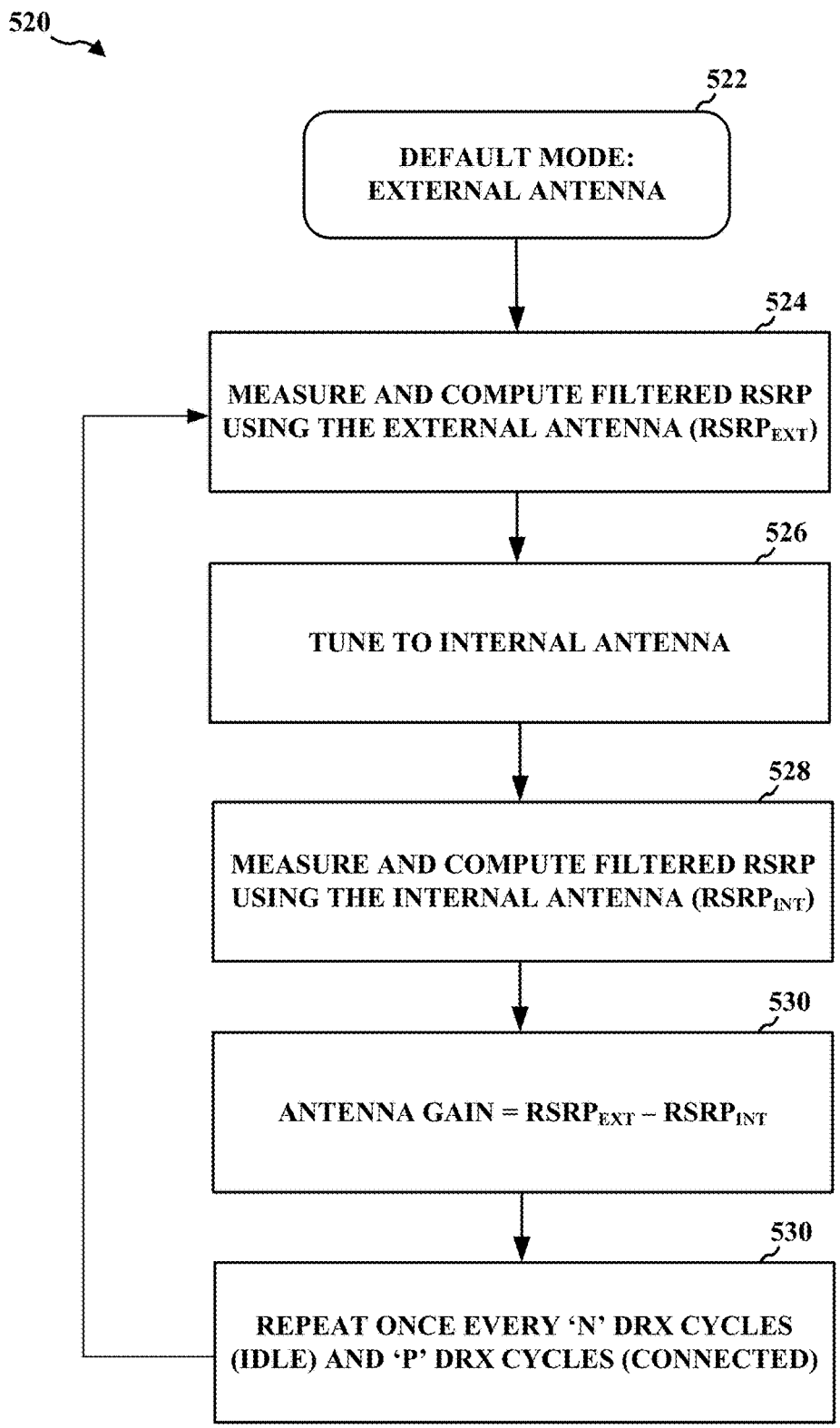
FIG. 5B is a flowchart of another method of using one or both of internal or external antennas to determines a gain at a UE in accordance with some aspects of the present disclosure.

FIGS. 5A and 5B are flowcharts 500 and 520 of a method of wireless communication according to the RSRP scheme at a UE. The method may be performed by a UE (e.g., UE 104, FIG. 1, UE 468', FIG. 4, and/or apparatus 802, FIG. 8). While, for purposes of simplicity of explanation, the method is shown and described as a series of acts, the method may not be limited by the order of acts, as some acts may, in accordance with one or more embodiments, occur in different orders and/or concurrently with other acts from that shown and described herein. For example, a method could alternatively be represented as a series of interrelated states or events, such as in a state diagram. Moreover, not all illustrated acts may be required to implement the method in accordance with one or more features described herein.

Referring to FIG. 5A, at block 502, the method 500 may optionally determine that an RSRQ value associated with the serving cell satisfies a gain determination threshold. For example, in some aspects, the UE 468' may execute the gain determination component 410 to determine whether an RSRQ value (e.g., RSRQ 418) detected via reception component 704 and associated with the serving cell (e.g., of base station 462) satisfies a gain determination threshold. In some aspects, the gain determination threshold may correspond to a value that triggers the determination of the RSRP value (e.g., RSRP 414) associated with the serving cell by or using the first antenna 480. In some aspects, determining the RSRP value (e.g., RSRP 414) using the first antenna 480 may be based on a determination that the RSRQ value (e.g., RSRQ 418) satisfies (e.g., meets or exceeds) the gain determination triggering threshold.

At block 504, the method 500 may determine an RSRP value associated with a serving cell using the first antenna.

For example, in some aspects, the UE 468' may execute at least one of the first antenna 480 or second antenna 482 of the reception component 704 to measure and provide one or more power signals to the gain determination component 410 in order to determine an RSRP value (e.g., RSRP 414) associated with a serving cell (e.g., of base station 462) using the first antenna 480.

At block 506, the method 500 may tune to a second antenna different from a first antenna. For instance, the UE 468' may execute the gain determination component 410 and/or the tuning component 708 to tune or switch to a second antenna 482 different from a first antenna 480. In some aspects, tuning to the second antenna 482 may occur during an inactive connected mode DRX (CDRX) period.

At block 508, the method 500 may determine an RSRP value associated with the serving cell using the second antenna. For instance, the UE 468' may execute the gain determination component 410 to determine an RSRP value (e.g., RSRP 416) associated with the serving cell (e.g., of the base station 462) by or using the second antenna 482. In some aspects, the RSRP value (e.g., RSRP 414) of the first antenna 480 and the RSRP value (e.g., RSRP 416) of the second antenna 482 are each filtered RSRP values.

At block 510, the method 500 may obtain a gain value based on a difference between the RSRP value of the first antenna and the RSRP value of the second antenna, the first antenna is located on an exterior of the UE and the second antenna is located within an interior of the UE. For example, the UE 468' may execute at least one of the first antenna 480 or second antenna 482 of the reception component 704 to measure and provide one or more power signals to the gain determination component 410 in order to obtain a gain value (e.g., gain 430) based on a difference between the RSRP value (e.g., RSRP 414) of the first antenna 480 and the RSRP value (e.g., RSRP 416) of the second antenna 482, the first antenna 480 may be located on an exterior of the UE 468' and the second antenna 416 may be located within an interior of the UE 468'.

At block 512, the method 500 may maintain a connection with the serving cell or reselect to another cell based on the gain value. For instance, the UE 468' may execute the mobility component 706 to maintain a radio resource connection (RRC) with the serving cell of base station 462 or reselect to another cell based on the gain value 430.

In some aspects, although not shown, the method 500 may optionally determine that a number of DRX cycles satisfies a gain determination threshold. For example, the UE 468' may execute the gain determination component 410 to determine that a number of DRX cycles satisfies a gain determination threshold. In some aspects, the gain determination threshold may trigger a determination of subsequent RSRP values associated with the serving cell. In some aspects, the number of DRX cycles may correspond to one of a first number of DRX cycles in an idle state or a second number of DRX cycles in an connected state. In some aspects, the UE may tune/measure using the second antenna 482 after a configurable number of DRX cycles (e.g., 'x' cycles), and may continue to measure using the second antenna 482 for the configurable number of DRX cycles (e.g., 'y' cycles) to obtain the averaged/filtered value.

For instance, in some aspects, the method 500 may determine a second RSRP value associated with the serving cell (e.g., of base station 462) using the first antenna 480 based on a determination that the number of DRX cycles satisfies the gain determination threshold, tune to the second antenna 482, and determine a second RSRP value associated with the serving cell using the second antenna 482. The method 500 may then obtain a second gain value based on a difference between the second RSRP value of the first antenna 480 and the second RSRP value of the second antenna 482.

Turning to FIG. 5B, at block 522, the method 520 may initiate or otherwise enter a default mode of communicating using an external antenna (e.g., first antenna 480). At block 524, the method 520 may measure and compute a filtered RSRP (e.g., (e.g., RSRP 414) using the external antenna (e.g., first antenna 480). At block 526, the method 529 may tune to an internal antenna (e.g., second antenna 482). At block 528, the method 500 may measure and compute the filtered RSRP (e.g., RSRP 416) using the internal antenna (e.g., second antenna 482). At block 530, the method 520 may determine the antenna gain based on a difference between the RSRP 414 of the external antenna and the RSRP 416 of the internal antenna. At block 530, the method 500 may determine to repeat the antenna gain determination once every 'N' DRX cycles while in idle mode and 'P' DRX cycles while in a connected mode. Each of the above blocks described herein with respect to the method 520 may be performed or executed by one or more components or subcomponents of UE 468' including the gain determination component 410.

FIGS. 6A-6D are flowcharts 600 and 620 of a method of wireless communication according to the RSRQ and RACH open loop power scheme at a UE. The method may be performed by a UE (e.g., UE 104, FIG. 1, UE 468', FIG. 4, and/or apparatus 802, FIG. 8). While, for purposes of simplicity of explanation, the method is shown and described as a series of acts, the method may not be limited by the order of acts, as some acts may, in accordance with one or more aspects, occur in different orders and/or concurrently with other acts from that shown and described herein. For example, a method could alternatively be represented as a series of interrelated states or events, such as in a state diagram. Moreover, not all illustrated acts may be required to implement a method in accordance with one or more features described herein.

At block 602, the method 600 may determine a current RSRQ value associated with a serving cell. For instance, in some aspects, the UE 468' (FIG. 4) may execute the gain determination component 410 to determine a current RSRQ value 434 associated with a serving cell (e.g., of base station 462). In some aspects, the current RSRQ value 434 may be a most recent RSRQ measured by at least one of the first antenna 480 or the second antenna 482 of the reception component 704.

At block 604, the method 600 may determine whether a RACH failure has occurred. For example, in some aspects, the gain determination component 410 may execute the RACH determination component 426 to determine whether a RACH failure has occurred due to network congestion or due to a contention resolution failure during the RACH procedure.

Method 600 may proceed to block 606 based on a determination that the RACH failure has occurred. Specifically, at block 606, the method 600 may obtain an antenna gain value based at least on a RACH power value and an RSRQ offset value. For instance, the UE 468' (FIG. 4) may execute the gain determination component 410 to obtain or determine an antenna gain value (e.g., gain 430) based at least on a RACH power value 420 and an RSRQ offset value 422.

In some aspects, obtaining the antenna gain value (e.g., gain 430) based at least on the RACH power value 420 and the RSRQ offset value 422 may include determining the RSRQ offset value 422 based on a difference between the current RSRQ value 434 and a previous RSRQ value (e.g., which may be an RARQ value measured before the current RSRQ value 434), determining a RACH gain value 426 based on a difference between an initial RACH gain value corresponding to a first message transmit power and a final RACH gain value corresponding to a successful message transmit power, and aggregating the RACH gain value 426 and the RSRQ offset value 422 to obtain the antenna gain 430.

Method 600 may proceed to 608 based on a determination that the RACH failure has not occurred. Specifically, at block 608, the method 600 may obtain the antenna gain value based on one of a matching entry in a memory log or a minimum of a maximum antenna gain value or an aggregation of a RACH gain value and an RSRQ offset value. For instance, the UE 468' (FIG. 4) may execute the gain determination component 410 to obtain or determine the antenna gain value (e.g., gain 430) based on one of a matching entry in a memory log 432 or a minimum of a maximum antenna gain value 424 or an aggregation of a RACH gain value 426 and the RSRQ offset value 422.

In some aspects, obtaining the antenna gain 430 based on one of the matching entry in the memory log 432 or the minimum of the maximum antenna gain value 424 or the aggregation of the RACH gain value 426 and the RSRQ offset value 422 may include determining whether the memory log 432 includes a stored antenna gain associated with a position location matching or proximate to a current location of the UE 468', identifying the stored antenna gain as the antenna gain based on a determination that the memory log 432 includes the stored antenna gain associated with the position location, and obtaining an RSRQ offset value 422 based on a difference between a current RSRQ value 434 and a previous RSRQ value based on a determination that the memory log 432 does not include the stored antenna gain associated with the position location.

In some aspects, the method 600 may obtain a RACH gain value 426 based on a difference between an initial RACH gain value corresponding to a first message transmit power and a final RACH gain value corresponding to a successful message transmit power, and identifying, as the antenna gain 430, the minimum of: the maximum antenna gain value 424, or the aggregation of the RACH gain value 426 and the RSRQ offset value 422.

At block 610, the method 600 may optionally provide at least one of the antenna gain, an Evolved Universal Terrestrial Radio Access (E-UTRA) Absolute Radio Frequency Channel Number (EARFCN) associated with the serving cell, a physical cell identifier (PCI) associated with the serving cell, or position location information of the UE. For instance, the UE 468' (FIG. 4) may execute the gain determination component 410 to provide, to the memory log 432, at least one of the antenna gain, an EARFCN associated with the serving cell, a PCI associated with the serving cell, or position location information of the UE 468'.

In some aspects, the method 600 may determine that a RACH procedure has been initiated such that determining the current RSRQ value 434 associated with the serving cell includes determining the current RSRQ value 434 based on a determination that the RACH procedure has been initiated.

Figure 6A:
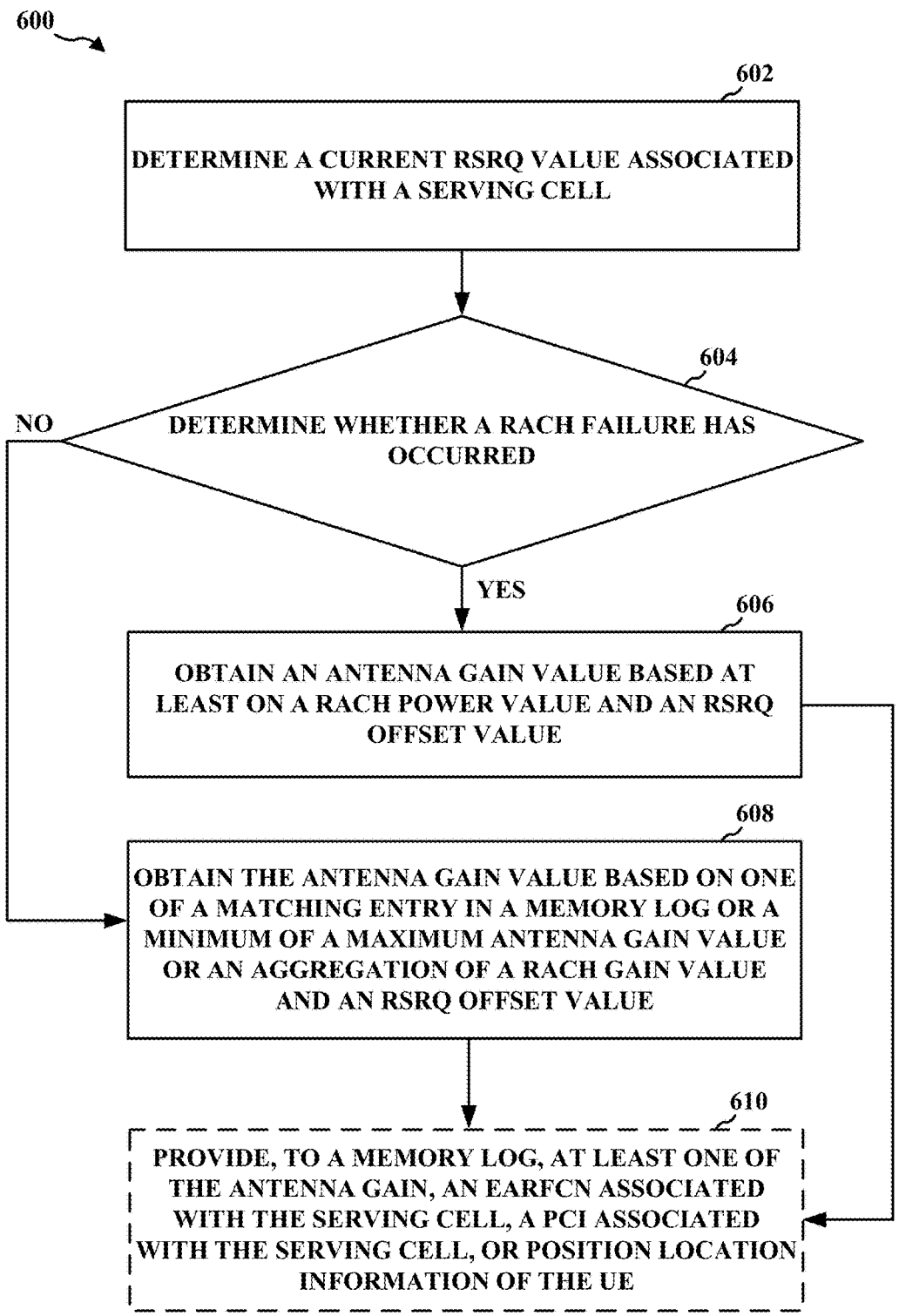
FIG. 6A is a flowchart of a method of using at least a reference signal and a random access channel (RACH) open loop power to determine a gain at a UE in accordance with some aspects of the present disclosure.
Figure 6B:
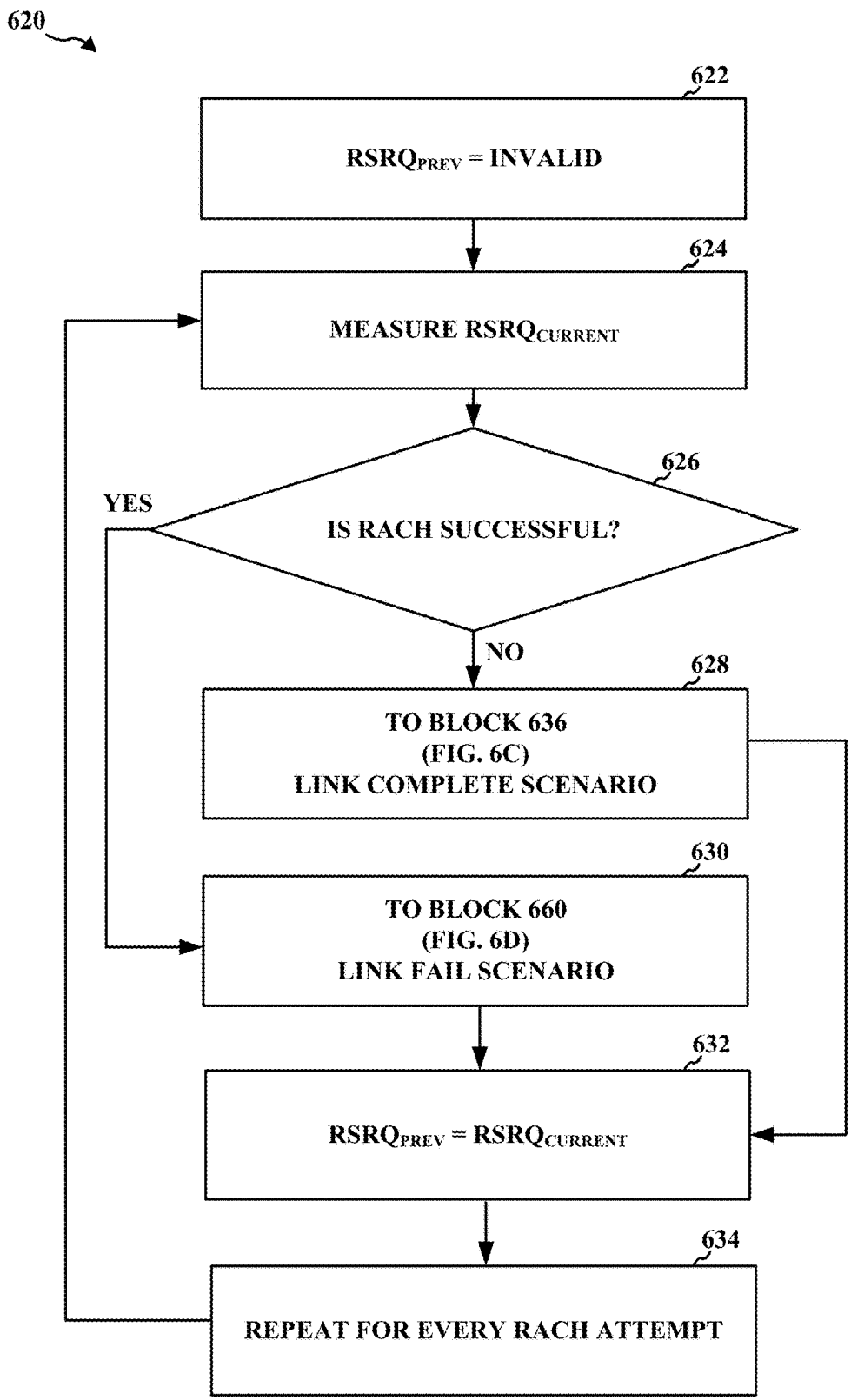
FIGS. 6B-6D are flowcharts of another method of using at least a reference signal and a RACH open loop power to determine a gain at a UE in accordance with some aspects of the present disclosure.

Referring to FIG. 6B, the method 620 may, at block 622, determine that a previous RSRQ value is invalid or not found. At block 624, the method 620 may measure a current RSRQ value 434. At block 626, the method 620 may determine whether a RACH is successful. Method 620 may proceed to block 628 if the RACH is not successful. Specifically, at block 628, the method 620 may continue to block 636 to perform the link complete scenario. If the RACH is unsuccessful, the method 620 may proceed to block 630. Specifically, at block 630 may continue to block 660 to perform the link fail scenario. Following completion of at least one of the link complete scenario or the link fail scenario, the method 620 may proceed to block 632, where a previous RSRQ value may be set equal to the current RARQ value. At block 634, the method 620 may repeat blocks 624-632 for every RACH attempt.

Figure 6C:
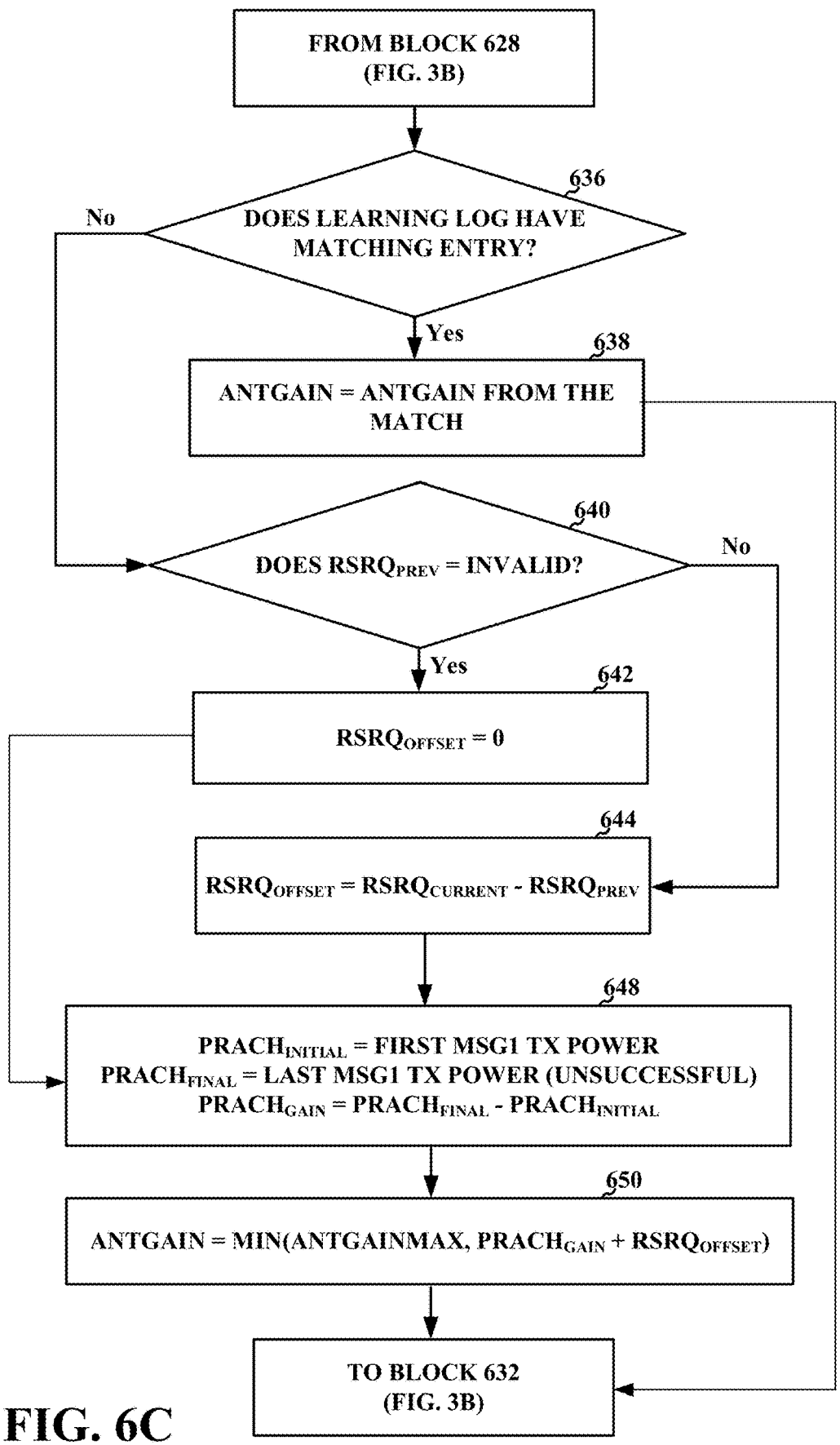

Referring to FIG. 6C, at block 636, the method 620 may determine whether the learning log has a matching entry of the current RARQ value. If a matching entry is found, the method 620 may proceed to block 638, where the antenna gain 430 may be equal to the antenna gain from the match. For example, the learning log (e.g., memory log 432 and/or machine learning component 428) may have one or more previously measured RSRQ values for which antenna gains were determined. The method 620 may return to block 632 following a determination of the antenna gain 430 at block 638. If a matching entry is not found, the method 620 may proceed to block 620, where the method 620 determines whether the previous RSRQ value is invalid. If the previous RSRQ value is determined to be invalid, the current RSRQ value may be set to zero at block 642. If the previous RSRQ value is determined not to be invalid, an RSRQ offset value 422 may be determined based on a difference between the current RSRQ value 434 and the previous RSRQ value at block 644. At block 648, the method 620 may determine or otherwise set an initial RACH power value as a first message transmit power, a final RACH power value as a last message transmit power (e.g., for unsuccessful transmission), and a RACH power gain 426 as the difference between the final RACH power and the initial RACH power value. At block 650, the method 620 may determine the antenna gain 430 based on a minimum of a maximum antenna gain 424 or an aggregation of the RACH gain value 426 and the RSRQ offset value 422.

Figure 6D:
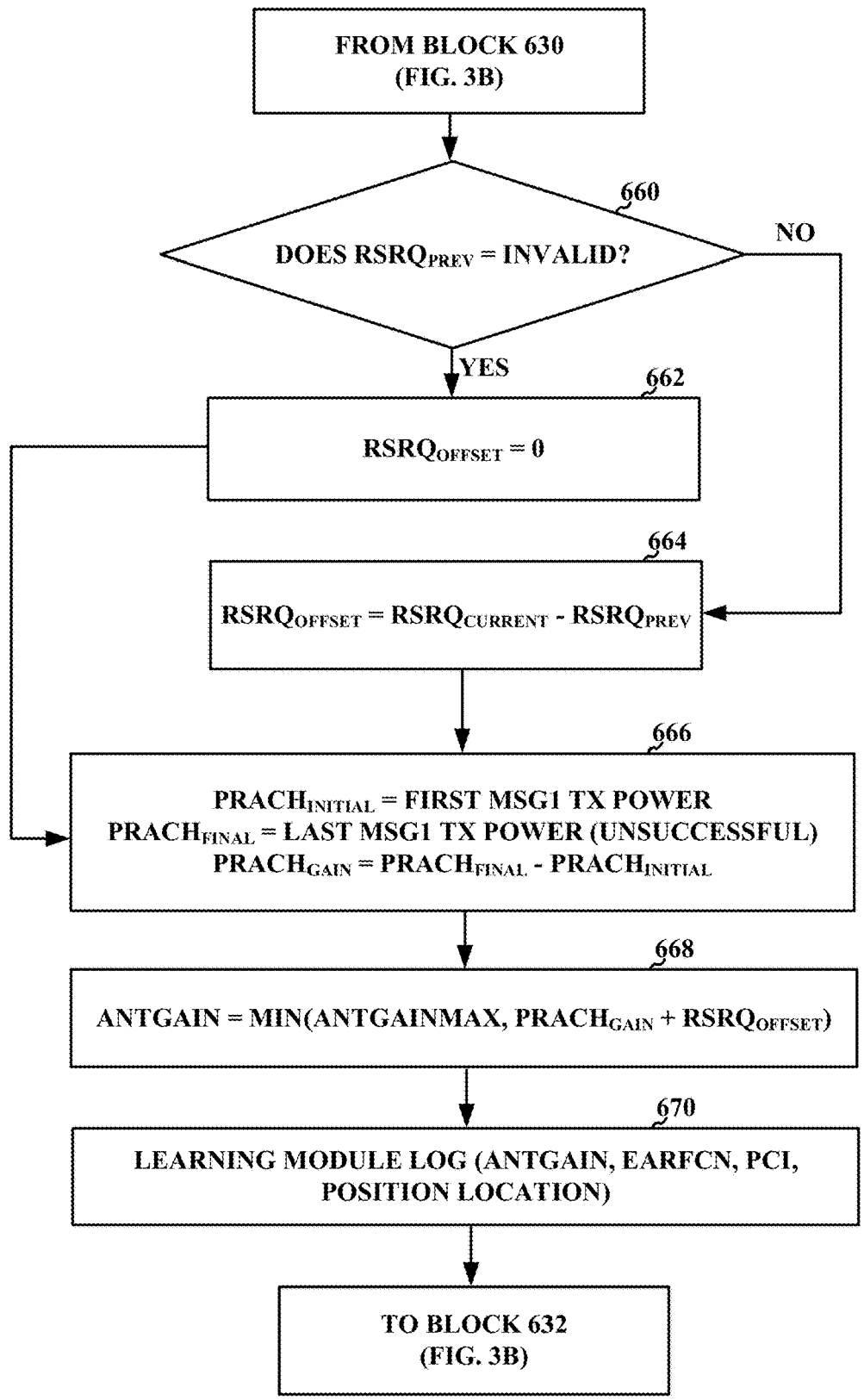

Referring to FIG. 6D, at block 660, the method 620 determines whether the previous RSRQ value is invalid. If the previous RSRQ value is determined to be invalid, the current RSRQ value 434 may be set to zero at block 662. If the previous RSRQ value is determined not to be invalid, an RSRQ offset value 422 may be determined based on a difference between the current RSRQ value 434 and the previous RSRQ value at block 664. At block 666, the method 620 may determine or otherwise set an initial RACH power value as a first message transmit power, a final RACH power value as a last message transmit power (e.g., for unsuccessful transmission), and a RACH power gain as the difference between the final RACH power and the initial RACH power value. At block 668, the method 620 may determine the antenna gain 430 based on a minimum of a maximum antenna gain or an aggregation of the RACH gain value 426 and the RSRQ offset value 422. At block 670, the method 620 may provide at least the antenna gain, EARFCN, PCI, and/or position location to a learning module (e.g., machine learning component 428).

Each of the above blocks described herein with respect to the method 620 may be performed or executed by one or more components or subcomponents of UE 468' including the gain determination component 410.

Figure 7:
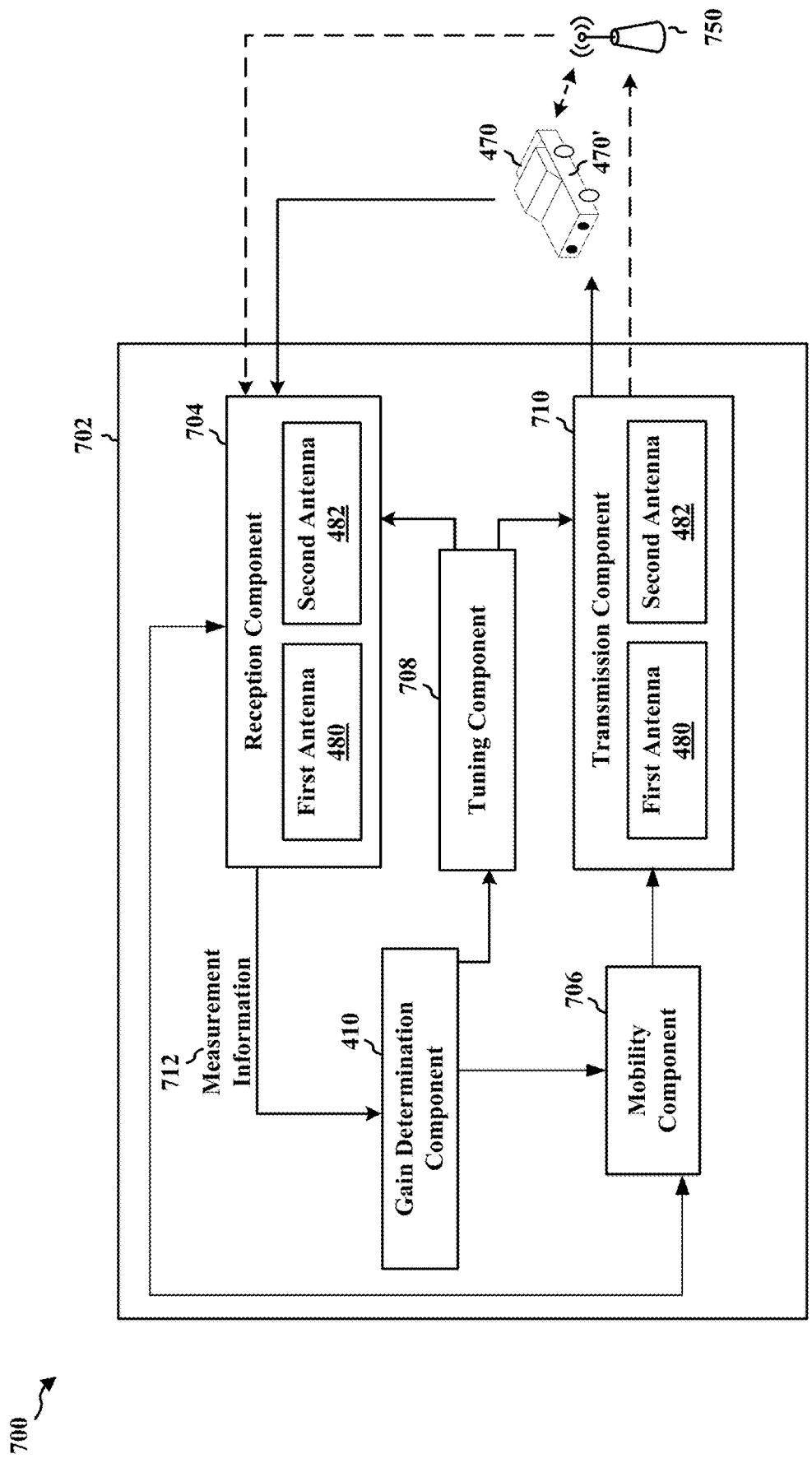
FIG. 7 is a conceptual data flow diagram illustrating the data flow between different means/components in an example apparatus according to some aspects of the present disclosure.

FIG. 7 is a conceptual data flow diagram 700 illustrating the data flow between different means/components in an example apparatus 702. The apparatus may be a UE such as the UE 468' (FIG. 4). The apparatus may include a reception component 704 including a first antenna 480 and a second antenna 482 that receives the measurement information 712 such as, but not limited to an RSRP 414, RSRP 416, RSRQ 418, and/or current RSRQ 434.

In some aspects, the gain determination component 410 may be configured to receive the RSRP 414 associated with a serving cell using a first antenna 480. The gain determination component 410 may then tune, via tuning component 708, to the second antenna 482 and measure the RSRP 416 associated with the serving cell. The gain determination component 410 may be configured to determine the gain 430 based on a difference between the RSRP 414 of the first antenna 480 and the RSRP 416 of the second antenna 482. The mobility component 706 may use the gain 430 to determine whether to maintain the serving cell or reselect to another cell.

Further, in some aspects, the gain determination component 410 may receive a current RSRQ 434. The gain determination component 410 may determine whether a RACH failure has occurred. The gain determination component 410 may be configured to determine the gain 430 based at least on a RACH power value 420 and an RSRQ offset value 422 based on a determination that the RACH failure has occurred. The gain determination component 410 may also be configured to determine the gain 430 based on one of a matching entry in a memory log 432 or a minimum of a maximum antenna gain 424 or an aggregation of a RACH gain 426 and an RSRQ offset value 428 based on a determination that the RACH failure has not occurred. The mobility component 706 may use the gain 430 to determine whether to maintain the serving cell or reselect to another cell.

The apparatus may include additional components that perform each of the blocks of the algorithm in the aforementioned flowcharts of FIGS. 5A, 5B, and 6A-6D. As such, each block in the aforementioned flowcharts of FIGS. 5A, 5B, and 6A-6D may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
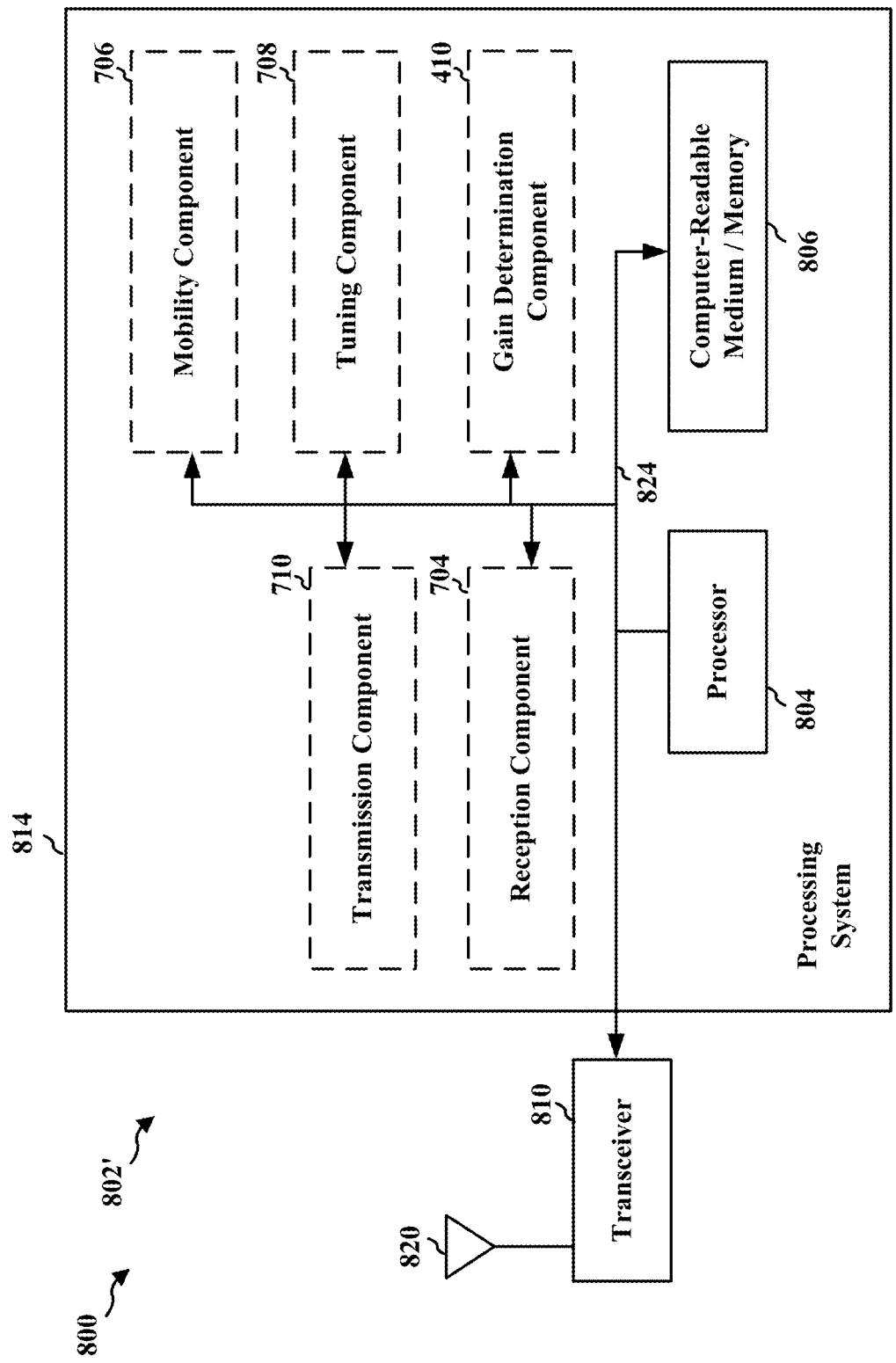
FIG. 8 is a diagram illustrating an example of a hardware implementation for an apparatus employing a processing system according to some aspects of the present disclosure.

FIG. 8 is a diagram 800 illustrating an example of a hardware implementation for an apparatus 802' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the reception component 704, the transmission component 710, the gain determination component 410, the tuning component 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 may be coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the reception component 704, mobility component 706, the transmission component 710, the resource selection component 410. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 802/802' for wireless communication includes means for determining a reference signal receive power (RSRP) value associated with a serving cell using a first antenna. The apparatus 802/802' further includes means for tuning to a second antenna different from the first antenna. The apparatus 802/802' further includes means for determining an RSRP value associated with the serving cell using the second antenna. The apparatus 802/802' further includes means for obtaining a gain value based on a difference between the RSRP value of the first antenna and the RSRP value of the second antenna, the first antenna is located on an exterior of the UE and the second antenna is located within an interior of the UE. The apparatus 802/802' further includes means for maintaining the serving cell or reselect to another cell based on the gain value.

Additionally, the apparatus 802/802' for resource transmission includes means for determining a current reference signal receive quality (RSRQ) value associated with a serving cell. The apparatus 802/802' further includes means for determining whether a random access channel (RACH) failure has occurred. The apparatus 802/802' further includes, in accordance with a determination that the RACH failure has occurred, means for obtaining an antenna gain value based at least on a RACH power value and an RSRQ offset value. The apparatus 802/802' further includes, in accordance with a determination that the RACH failure has not occurred, means for obtaining the antenna gain value based on one of a matching entry in a memory log or a minimum of a maximum antenna gain value or an aggregation of a RACH gain value and the RSRQ offset value. The apparatus 802/802' further includes means for maintaining the serving cell or reselect to another cell based on the gain value.

The aforementioned means may be one or more of the aforementioned components of the apparatus 802 and/or the processing system 814 of the apparatus 802' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   determining a reference signal receive power (RSRP) value associated with a serving cell using a first antenna;
   tuning to a second antenna different from the first antenna;
   determining an RSRP value associated with the serving cell using the second antenna;
   obtaining a gain value based on a difference between the RSRP value of the first antenna and the RSRP value of the second antenna, wherein the first antenna is located on an exterior of the UE and the second antenna is located within an interior of the UE; and
   maintaining a connection with the serving cell or reselecting to another cell based on the gain value.

2. The method of claim 1, further comprising determining whether a reference signal receive quality (RSRQ) value associated with the serving cell satisfies a gain determination threshold corresponding to a value that triggers the determination of the RSRP value associated with the serving cell using the first antenna,
   wherein determining the RSRP value using the first antenna is based on a determination that the RSRQ value satisfies the gain determination triggering threshold.

3. The method of claim 1, further comprising:
   determining that a number of discontinuous reception (DRX) cycles satisfies a gain determination threshold triggering determination of subsequent RSRP values associated with the serving cell;
   determining a second RSRP value associated with the serving cell using the first antenna based on a determination that the number of DRX cycles satisfies the gain determination threshold;
   tuning to the second antenna;
   determining a second RSRP value associated with the serving cell using the second antenna; and
   obtaining a second gain value based on a difference between the second RSRP value of the first antenna and the second RSRP value of the second antenna.

4. The method of claim 3, wherein the number of DRX cycles corresponds to one of a first number of DRX cycles in an idle state or a second number of DRX cycles in an connected state.

5. The method of claim 1, wherein tuning to the second antenna occurs during an inactive connected mode discontinuous reception (CDRX) period.

6. The method of claim 1, wherein the RSRP value of the first antenna and the RSRP value of the second antenna are each filtered RSRP values.

7. The method of claim 1, wherein the UE is associated with a vehicle.

8. An apparatus for wireless communication, comprising:
   a memory; and
   at least one processor communicatively coupled to the memory and configured to:
      determine a reference signal receive power (RSRP) value associated with a serving cell using a first antenna;
      tune to a second antenna different from the first antenna;
      determine an RSRP value associated with the serving cell using the second antenna;
      obtain a gain value based on a difference between the RSRP value of the first antenna and the RSRP value of the second antenna, wherein the first antenna is located on an exterior of the UE and the second antenna is located within an interior of the UE; and
      maintaining a connection with the serving cell or reselecting to another cell based on the gain value.

9. The apparatus of claim 8, wherein the at least one processor is further configured to determine whether a reference signal receive quality (RSRQ) value associated with the serving cell satisfies a gain determination threshold corresponding to a value that triggers the determination of the RSRP value associated with the serving cell,
   wherein determining the RSRP value using the first antenna is based on a determination that the RSRQ value satisfies the gain determination triggering threshold.

10. The apparatus of claim 8, wherein the at least one processor is further configured to:

determine that a number of discontinuous reception (DRX) cycles satisfies a gain determination threshold triggering determination of subsequent RSRP values associated with the serving cell;

determine a second RSRP value associated with the serving cell using the first antenna based on a determination that the number of DRX cycles satisfies the gain determination threshold;

tune to the second antenna;

determine a second RSRP value associated with the serving cell using the second antenna; and obtain a second gain value based on a difference between the second RSRP value of the first antenna and the second RSRP value of the second antenna.

11. The apparatus of claim 10, wherein the number of DRX cycles corresponds to one of a first number of DRX cycles in an idle state or a second number of DRX cycles in an connected state.

12. The apparatus of claim 8, wherein tuning to the second antenna occurs during an inactive connected mode discontinuous reception (CDRX) period.

13. The apparatus of claim 8, wherein the RSRP value of the first antenna and the RSRP value of the second antenna are each filtered RSRP values.

14. The apparatus of claim 8, wherein the apparatus corresponds to a vehicle.

15. An apparatus for wireless communication, comprising:

means for determining a reference signal receive power (RSRP) value associated with a serving cell using a first antenna;

means for tuning to a second antenna different from the first antenna;

means for determining an RSRP value associated with the serving cell using the second antenna;

means for obtaining a gain value based on a difference between the RSRP value of the first antenna and the RSRP value of the second antenna, wherein the first antenna is located on an exterior of the UE and the second antenna is located within an interior of the UE; and means for maintaining a connection with the serving cell or reselecting to another cell based on the gain value.

16. The apparatus of claim 15, further comprising means for determining whether a reference signal receive quality (RSRQ) value associated with the serving cell satisfies a gain determination threshold corresponding to a value that triggers the determination of the RSRP value associated with the serving cell using the first antenna, wherein determining the RSRP value using the first antenna is based on a determination that the RSRQ value satisfies the gain determination triggering threshold.

17. The apparatus of claim 15, further comprising:

means for determining that a number of discontinuous reception (DRX) cycles satisfies a gain determination threshold triggering determination of subsequent RSRP values associated with the serving cell;

means for determining a second RSRP value associated with the serving cell using the first antenna based on a determination that the number of DRX cycles satisfies the gain determination threshold;

means for tuning to the second antenna;

means for determining a second RSRP value associated with the serving cell using the second antenna; and means for obtaining a second gain value based on a difference between the second RSRP value of the first antenna and the second RSRP value of the second antenna.

18. The apparatus of claim 17, wherein the number of DRX cycles corresponds to one of a first number of DRX cycles in an idle state or a second number of DRX cycles in an connected state.

19. The apparatus of claim 15, wherein tuning to the second antenna occurs during an inactive connected mode discontinuous reception (CDRX) period.

20. The apparatus of claim 15, wherein the RSRP value of the first antenna and the RSRP value of the second antenna are each filtered RSRP values.

21. The apparatus of claim 15, wherein the apparatus corresponds to a vehicle.

22. A non-transitory computer-readable medium storing computer code executable by a processor for wireless communications at a network entity comprising code for:

determining a reference signal receive power (RSRP) value associated with a serving cell using a first antenna;

tuning to a second antenna different from the first antenna;

determining an RSRP value associated with the serving cell using the second antenna;

obtaining a gain value based on a difference between the RSRP value of the first antenna and the RSRP value of the second antenna, wherein the first antenna is located on an exterior of the UE and the second antenna is located within an interior of the UE; and maintaining a connection with the serving cell or reselecting to another cell based on the gain value.

23. The computer-readable medium of claim 22, further comprising code for determining whether a reference signal receive quality (RSRQ) value associated with the serving cell satisfies a gain determination threshold corresponding to a value that triggers the determination of the RSRP value associated with the serving cell using the first antenna, wherein determining the RSRP value using the first antenna is based on a determination that the RSRQ value satisfies the gain determination triggering threshold.

24. The computer-readable medium of claim 22, further comprising code for:

determining that a number of discontinuous reception (DRX) cycles satisfies a gain determination threshold triggering determination of subsequent RSRP values associated with the serving cell;

determining a second RSRP value associated with the serving cell using the first antenna based on a determination that the number of DRX cycles satisfies the gain determination threshold;

tuning to the second antenna;

determining a second RSRP value associated with the serving cell using the second antenna; and obtaining a second gain value based on a difference between the second RSRP value of the first antenna and the second RSRP value of the second antenna.

25. The computer-readable medium of claim 24, wherein the number of DRX cycles corresponds to one of a first number of DRX cycles in an idle state or a second number of DRX cycles in an connected state.

26. The computer-readable medium of claim 22, wherein tuning to the second antenna occurs during an inactive connected mode discontinuous reception (CDRX) period.

27. The computer-readable medium of claim 22, wherein the RSRP value of the first antenna and the RSRP value of the second antenna are each filtered RSRP values.

28. The computer-readable medium of claim 22, wherein the UE is associated with a vehicle.

* * * * *